April 26, 1966  G. J. SHELDON ETAL  3,248,063
FIBER GUIDE

Filed Sept. 12, 1963  2 Sheets-Sheet 1

GILBERT J. SHELDON
ROBERT W. STOKES
INVENTORS

BY

ATTORNEYS

April 26, 1966   G. J. SHELDON ETAL   3,248,063
FIBER GUIDE
Filed Sept. 12, 1963   2 Sheets-Sheet 2
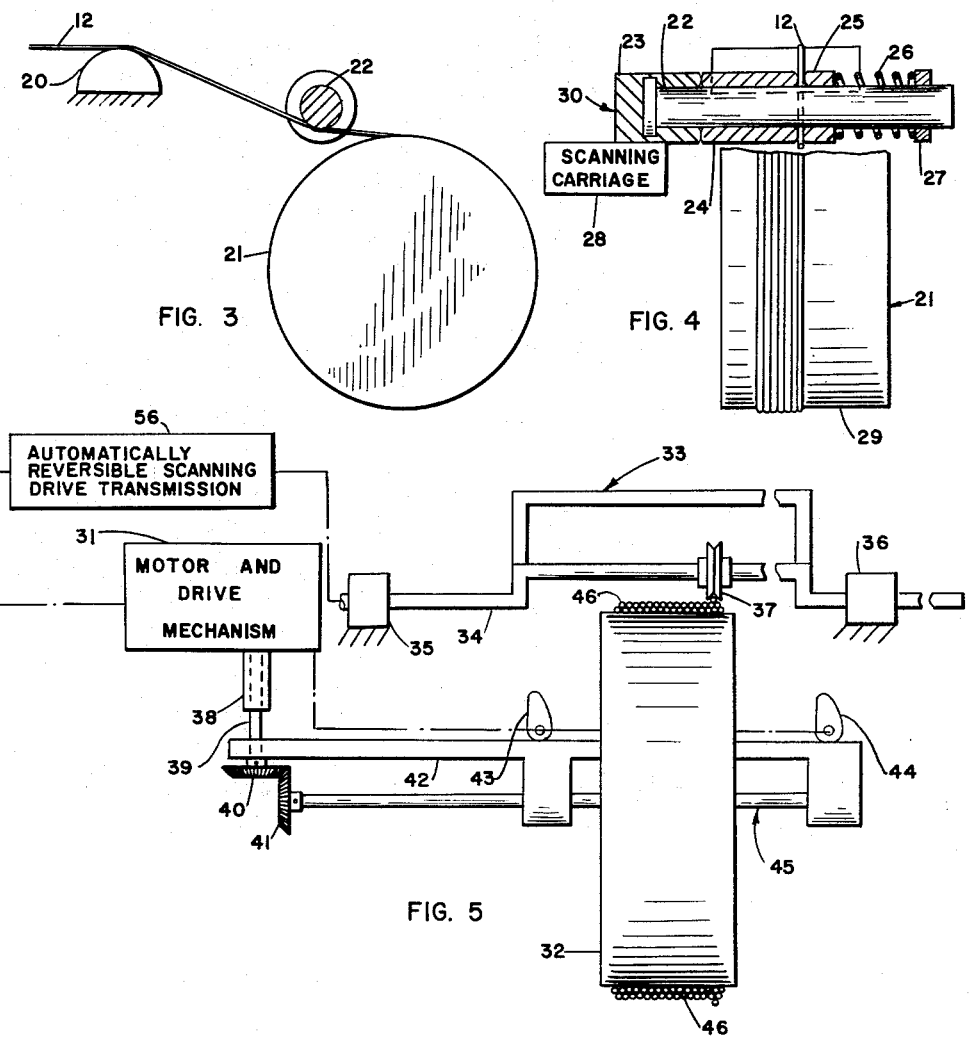
FIG. 6
GILBERT J. SHELDON
ROBERT W. STOKES
INVENTORS
BY *Arthur L. Nelson*
*Frank C. Parker*
ATTORNEYS

3,248,063
FIBER GUIDE

Gilbert J. Sheldon, Irondequoit, and Robert W. Stokes, Macedon, N.Y., assignors to Bausch & Lomb Incorporated, Rochester, N.Y., a corporation of New York
Filed Sept. 12, 1963, Ser. No. 308,402
3 Claims. (Cl. 242—18)

This invention relates to the manufacture of a continuous fiber, and more particularly to the guiding of the fiber during the winding operation.

In the past years considerable work has been done in the field of winding flexible elements such as cable, rope, thread and various other flexible elements. Due to the relatively large diameter of such an element, nearness of the guide for maintaining a level wind on the drum is not particularly critical.

The winding of a fiber glass having a diameter of a few microns presents an entirely different problem in the field of level winding. It is imperative that the guide for providing a level wind must be in close proximity to the winding surface on the drum. Accordingly, if the guide is formed with a groove to receive the fiber instead of a guide encircling the fiber, and the tension on the fiber prior to its engagement with the guide is utilized to hold the fiber on the guide, then the guide may be positioned nearer to the drum. Accordingly this invention is intended to accomplish this result wherein the distance intermediate the guide and the winding drum is reduced to a minimum and no guide structure is intermediate the fiber and the drum. This is accomplished through deflection of the fiber direction by a fiber stabilizer and a fiber guide.

It is an object of this invention to provide a predetermined tension, and deflection of a glass fiber from movement in a linear path to maintain continuous contact on a fiber guide to control its movement onto a fiber winding drum.

It is another object of this invention to reduce the distance intermediate the fiber guide and the first point of contact on a winding drum to provide maximum control of the fiber prior to engagement with the winding drum.

It is a further object of this invention to provide peripheral contact for no greater than 180° of a continuously moving fiber by a stabilizer, or a guide to control the movement of a continuous fiber as it is positioned on a fiber receiving member.

It is a further object of this invention to deflect a continuously moving fiber and create a fiber tension for maintaining its continuous contact with a guide in close proximity to a winding drum.

The objects of this invention are accomplished by providing a fiber stabilizer at a point subsequent to the fiber source which is delivering the continuously moving fiber and which dampens traverse vibrations and generally stabilizes the continuous movement of the fiber through a single point. The fiber guide is positioned intermediate the stabilizer and the winding drum and deflects the fiber causing a lateral component of force biasing the fiber to a continuous engagement with the stabilizer and the fiber guide. No more than 180° contact is necessary between the fiber and the stabilizer, or the fiber and the guide due to the fiber deflection. This provides maximum control of the fiber as it is laid down on a fiber drum.

The description and illustrations show the preferred embodiments of this invention.

FIG. 3 illustrates a side elevation view of a modification of the invention.

FIG. 4 illustrates an end view of the modification of the invention.

FIG. 5 illustrates an end view of a fiber winding device which permits winding of a plurality of layers with means for maintaining a minimum distance intermediate the guide and the first point of contact on the winding drum.

FIG. 6 illustrates a modification of a fiber guide.

Figure 1:
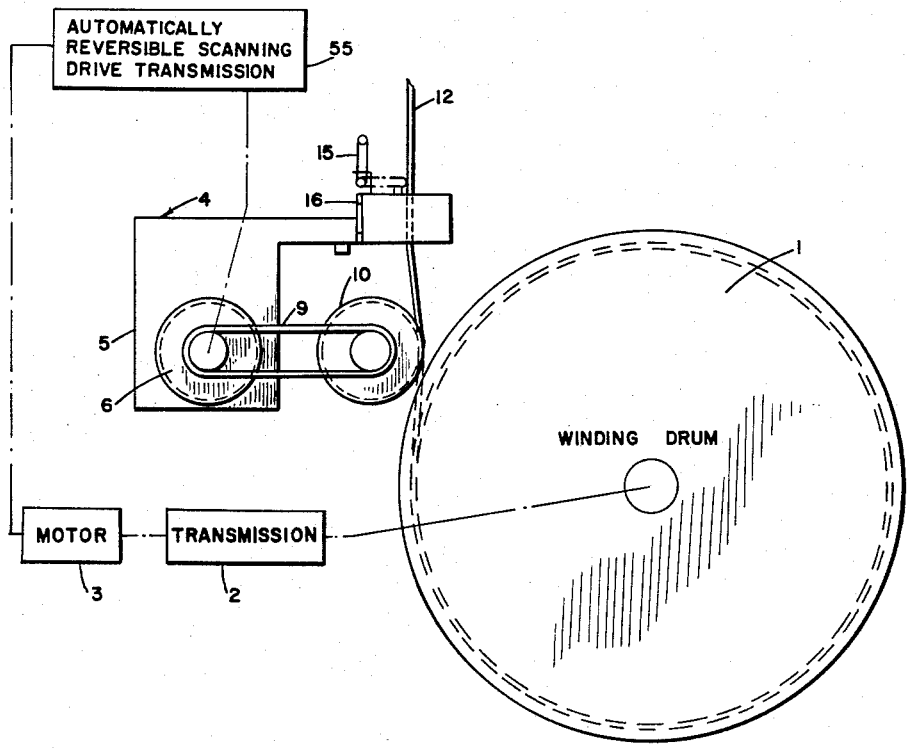
FIG. 1 illustrates a side elevation view of a fiber winding device.

Referring to FIG. 1 a winding drum 1 is driven through a transmission 2 by the motor 3. The motor provides the driving means for the guide 4. The guide 4 includes a nut 5 which receives a screw member 6 which is fixed within a suitable bearing means 7 and 8. As the screw 6 rotates a positive drive belt 9 or gear also rotates the screw member 10 similarly supported in bearing means 7 and 8. A continuous fiber source 11 is mounted above the winding drum 1. The fiber 12 is drawn between the two pads 13 and 14 which are biased to a closed position by a suitable biasing force. The initial position of the fiber 12 in the pads 13 and 14 is controlled by the locating bar 15 which is hinged to the pad supporting structure 16. Once the fiber 12 is positioned in the pads 13 and 14 the bar 15 is pivoted into a vertical position as indicated and no longer contacts the fiber 12. The fiber is guided through the point initially set by the bar 15 prior to its removal from the contacting position with the fiber.

The screws 6 and 10 rotate in phase by the belt, or gears 9 to cause the nut 5 to move traversely as the fiber 12 moves traversely due to the biasing force caused by the sides of the thread in screw 10 in which it rides. The fiber 12 contacts the sides of the thread due to the helical angle of the thread. The helical angle causes a slight lifting of the fiber to raise it slightly from the root of the thread. The sides of the thread create equal components of force maintaining the fiber fixed within the thread. As the screw 10 rotates in response to the belt 9 the fiber is moved traversely across the face 17 of the winding drum 1 thereby creating a level wind on the peripheral facing of the drum. The scan direction is automatically reversed by the automatically reversible scanning drive transmission 55 when the limits of the scan are reached. Preferably for a perfect wind the pitch of the screw 10 and screw 6 is equal to the fiber diameter and therefore the screws 6 and 10 make one revolution for each winding drum revolution.

The inventor does not wish to limit the invention to this fixed relationship because this limits the thread dimensions to a fixed pitch and depth of thread. If the gear ratio through the transmission 2 is altered any pitch of the screw 10 might be used with the winding drum 1 by changing the number of degrees of revolution of the screw 10 relative to one revolution of the winding drum 1. The screw thread of screws 6 and 10 may be any type of a thread although the conventional screw thread is illustrated.

The direction of rotation of the screws 6 and 10 is reversed to reverse the scan of the fiber on the peripheral face of the winding drum 1. This device has an advantage of reducing the wear of the guide caused by the fiber due to the fact that the screw is constantly in motion and the wear is distributed throughout the length of the thread with equal wear on each side of the thread.

Figure 2:
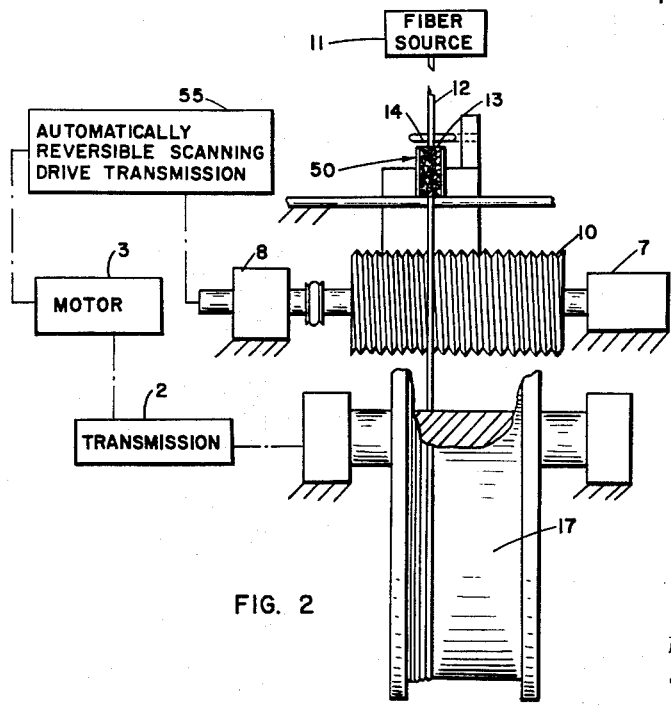
FIG. 2 illustrates an end view of the same fiber winding device.

Referring to FIG. 2 the fiber 12 is illustrated as passing through a plane normal to the axis of the screw 10. This causes the fiber 12 to be positioned at a slight angle to the helix of the screw 10. This in turn raises the fiber slightly from the root of the thread eliminating the wear of the root of the thread. The continuous wearing of the root of the thread by a fiber of a constant diameter creates a danger of fiber breakage in event of a slight increase in fiber diameter as the thread passes through the worn portion of the thread root. This danger is eliminated by raising the fiber radially due to the helix angle of the thread, because the fiber will be deflected by the thread walls as the fiber contacts are not at the same point on the length of the thread.

FIGS. 3 and 4 illustrate a modification of this invention. The stabilizer 20 engages the fiber 12 as it continuously moves by the surface of the stabilizer 20. The winding drum 21 is driven by a suitable driving means and causes continual movement of the fiber as it engages a limiting peripheral arc on the rod 22. The rod 22 is rotatably mounted on a support 23. The rod 22 is received within the sleeves 24 and 25. The sleeve 25 is biased to an engaging position with the fiber 12 by the spring 26 contacting the pin 27. The spring 26 causes a lateral engagement of the fiber 12 by the sleeve 24 and sleeve 25. This maintains a fixed relationship of the fiber 12 relative to the rod 22. A suitable carriage 28 causes the fiber to scan the peripheral surface 29 of the drum 21. A suitable motor, and automatically reversible scanning drive transmission 56 as illustrated in FIG. 5 may be used to drive the scanning carriage.

The rod 22 of the guide 30 causes the fiber 22 to continuously engage with the stabilizer 20. The stabilizer 20 may be made of any suitable wear resistant material. One form of the guide which has operated satisfactorily is Teflon wool. The sleeves 24 and 25 have limited thickness permitting their positioning very closely to the periphery of the drum 21. This permits very accurate control of the fiber as it is wound on the drum 21.

FIG. 5 illustrates another modification of this device wherein a motor and drive mechanism 31 supplies the driving means for the drum 32 and the guide 33. The shaft 34 is slidably mounted in the bearing 35 and 36 and rotatably supports a pulley 37. An automatically reversible scanning drive transmission 56 is used to drive the guide 33 in a reciprocating manner to repetitively scan the drum 32. The thread engaging portion of the pulley 37 is at the center of the shaft 34 to create minimum deflection due to vibrations of the shaft.

The motor and drive mechanism has a sleeve 38 which receives a shaft 39. A spline connection in the sleeve 38 engages a suitable portion on the shaft 39 to drive the bevel gears 40 and 41 and winding drum assembly. This permits axial movement of the shaft 39 relative to the motor and drive mechanism.

A similar drive shaft from the motor and drive mechanism 31 drives the cams 43 and 44. The cams 43 and 44 index the winding drum assembly 45 away from the guide 33 at a rate equal to the rate of the laying layers of windings on the periphery of the drum 32. In other words the cams 43 and 44 move the drum 32 away from the guide 33 in increments responsive to the laying of one complete layer on the periphery of the drum 32.

This type of mechanism is necessary only where a perfect level wind is necessary for all layers of the fiber bundle 46 laid on the periphery of the drum 32. Each succeeding layer as illustrated may be at least two less fibers than a preceding layer to prevent slippage of the outer two fibers as the bundle is wound.

For some uses, only a single layer is necessary on the periphery of the drum which may be later bonded while on the drum to fix the relationship of all fibers in the two ends of the fiber bundle and then severed to remove it from the drum.

FIG. 6 illustrates a modification of a guide which may be used with any of the preceding illustrations in FIGS. 3, 4 and 5. This type of a guide has a disadvantage of receiving all its wear on a very limited surface. The guide wear is substantially reduced where the guide is formed of such a material as diamond. The material of which the guide is made to a large extent depends on the type of use to which the fiber eventually will be used. If no scratches, nicks, or dings can be tolerated on the periphery of the fiber then a softer material for a guide is preferred, however, if this is not objectionable then a harder material may be used in a guide as illustrated in FIG. 6.

The operation of the device will be described in the following paragraphs.

Referring to FIGS. 1 and 2 a fiber source 11 supplies a continuous fiber. The fiber is continuously wound on the drum at a predetermined rate of speed. Intermediate the source and the winding drum 1 is positioned a stabilizer 50 including pads 13 and 14 which engage the fiber as it continuously passes through the stabilizer 50. The stabilizer decreases, or completely eliminates vibrations of the fiber in a traverse direction and to a limited extent reduces surging of the fiber in a longitudinal direction. It is however, realized that further dampening means to maintain a continuous even tension on the fiber prior to the stabilizer may be devised although not illustrated in this disclosure. The stabilizer 50 is supported on the nut 5 and moves axially responsive to the rotation of the screw 6 which drives the screw 10 in synchronous phase relation. The screw 10 receives the fiber 12 within the groove intermediate the sides of the thread and produces lateral components of force which are equal and opposite on the opposing sides of the fiber. This maintains the position of the fiber within the thread. The fiber 12 does not pass in a linear direction intermediate the stabilizer 50 and the first point of contact on the periphery 17 of the winding drum 1 but is deflected and caused to engage the thread of the screw 10 and remain seated within the thread due to the deflecting force of the screw 10. The guide structure for at least 100° intermediate the fiber and the winding drum is completely removed to facilitate positioning of the guide in close proximity to the periphery of the drum. This provides precision control of the fiber as it is wound on the periphery of the drum.

A driving mechanism comprising the motor 3 and the transmission 2 rotates the drum 1 in a predetermined relation to the screw 6. This relationship causes a traverse movement of the fiber to equal at least the fiber diameter for every single revolution of the winding drum, and provides an accurate control of an extremely small fiber as it is laid on the drum.

Referring to FIGS. 3 and 4 a similar winding device is illustrated in which the traverse movement causing a scan of fiber is created by a carriage 28. The fiber is guided around the underside of the rod 22 which again is in close proximity to the peripheral surface 29 of the drum 21. The guide 30 provides accurate control of the scan of the fiber on a peripheral surface on the drum.

FIG. 5 illustrates specific means of supporting the guide 33. The radial dimension between the guide and the winding drum is controlled in response to the number of layers which are wound on the drum. Due to the extremely short distance intermediate the guide 33 and the drum 32 it is necessary that increments of movement accompany the winding of each layer on the drum. Again it is pointed out that due to an extremely small diameter of the fiber incremental movements of the guide relative to the drum is necessary to provide the precision wind in producing a fiber bundle capable of image transmission.

FIG. 6 illustrates a guide which is supported on a carriage similar to 28 of FIG. 5 which is moved traversely to scan the peripheral surface of the drum.

The preferred embodiments of this invention have been illustrated and described. The scope of the invention is defined by the attached claims.

We claim:

1. A fiber winding device comprising, a source of a continuous fiber, a winding drum continuously pulling and winding said fiber, a resilient pad frictionally engaging said fiber and reducing vibrations of said fiber to a minimum, a guide means including a rotating screw positioned intermediate said pad and said drum constructed and arranged for deflecting the movement of said fiber to a nonlinear path between the fiber contact with the screw thread on said guide means and said drum for retaining said fiber in said screw thread, means connected to said pad and said screw moving said pad laterally and rotating said screw to coordinate the lateral movement of said pad with the contact of the fiber with the screw thread to thereby scan the length of said drum and produce a helical winding on said drum simultaneously with the rotation of the drum.

2. A fiber winding device comprising, a source of a continuous fiber, a resilient stabilizing pad enclosing said fiber and continuously contacting said fiber for reducing vibrations of said fiber to a minimum, a winding drum continuously pulling said fiber through said pad and winding said fiber on the drum, a guide including a rotating screw having a fiber groove constructed and arranged between said pad and said winding drum for biasing said fiber to pass through a non-linear path from said stabilizing pad to said drum, means connected to said guide and said pad for rotating said screw and causing said pad to scan at a rate coordinated with the contact of said fiber with said screw for axially scanning said fiber drum simultaneously with the rotation to thereby produce a level winding of the fiber on the periphery of said drum.

3. A fiber winding device, comprising, a source of a continuous fiber, a winding drum continuously winding said fiber on the periphery of said drum, a stabilizing pad engaging the periphery of said fiber and confining the continuous movement of said fiber through a predetermined point, a retractable locating bar pivotally supported on said pad to initially establish the predetermined point through which said fiber will pass, a guide including a screw having a grooved portion for receiving said fiber positioned intermediate said pad and said winding drum constructed and arranged for maintaining the fiber in the grooved portion of said screw and biasing said fiber through a non-linear movement intermediate said pad and said drum, means connected to said screw and said pad for rotating said screw and causing said pad to synchronously scan in coordination with the fiber contact with said screw to thereby provide a means for winding said fiber on the periphery of said drum.

References Cited by the Examiner

UNITED STATES PATENTS

| | | | |
|---|---|---|---|
| 1,057,008 | 3/1913 | Phillips | 242—158.4 X |
| 1,357,434 | 11/1920 | Anderson. | |
| 1,627,188 | 5/1927 | Lightfoot | 242—9 |
| 1,956,632 | 5/1934 | Snyder | 242—9 |
| 2,305,045 | 12/1942 | Torrence | 242—158.3 |
| 2,683,567 | 7/1954 | Lense | 242—9 |

FOREIGN PATENTS

| | | |
|---|---|---|
| 718,146 | 10/1931 | France. |
| 108,407 | 8/1917 | Great Britain. |
| 188,668 | 4/1937 | Switzerland. |

MERVIN STEIN, *Primary Examiner.*

S. N. GILREATH, *Assistant Examiner.*